United States Patent
Bristol et al.

(10) Patent No.: US 7,491,127 B2
(45) Date of Patent: Feb. 17, 2009

(54) SPLINE WITH LUBRICANT RETENTION FEATURE FOR USE IN TORQUE LIMITER

(75) Inventors: Brent L. Bristol, Phoenix, AZ (US); Remo N. Neri, Cave Creek, AZ (US); Kevin K. Chakkera, Chandler, AZ (US); David M. Mathis, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 317 days.

(21) Appl. No.: 11/414,645

(22) Filed: Apr. 27, 2006

(65) Prior Publication Data

US 2007/0254743 A1    Nov. 1, 2007

(51) Int. Cl.
  *F16D 3/06* (2006.01)
(52) U.S. Cl. .................. 464/16; 403/359.6
(58) Field of Classification Search ............ 464/16, 464/162; 403/359.1, 359.6; 74/468
See application file for complete search history.

(56) References Cited

U.S. PATENT DOCUMENTS

| | | | |
|---|---|---|---|
| 1,586,990 A * | 6/1926 | Harrison | 403/359.6 X |
| 1,756,335 A | 4/1930 | Bijur | |
| 1,973,702 A | 9/1934 | Cooke | |
| 1,973,708 A | 9/1934 | Cooke | |
| 3,203,201 A | 8/1965 | Harbke | |
| 3,454,136 A | 7/1969 | Stark | |
| 3,455,122 A * | 7/1969 | Greenberg | 464/162 X |
| 3,521,462 A | 7/1970 | Heidrich | |
| 3,889,489 A | 6/1975 | Casey et al. | |
| 4,153,260 A | 5/1979 | Joyner | |
| 4,741,220 A | 5/1988 | Watanabe et al. | |
| 4,905,535 A | 3/1990 | Ludwig et al. | |
| 4,913,671 A | 4/1990 | Gavriles et al. | |
| 5,503,494 A | 4/1996 | Kamata et al. | |
| 5,507,703 A | 4/1996 | Madsack et al. | |
| 5,624,344 A | 4/1997 | Yehl et al. | |
| 5,646,355 A | 7/1997 | Fukushima et al. | |
| 5,901,817 A | 5/1999 | Gitnes | |
| 6,089,113 A | 7/2000 | Sato et al. | |
| 6,786,315 B1 | 9/2004 | Christensen | |
| 2004/0035653 A1 | 2/2004 | Christensen | |

FOREIGN PATENT DOCUMENTS

DE    19717290 A1    10/1998
FR    2432380    2/1980

OTHER PUBLICATIONS

European Searach Report EP 07106990 dated Aug. 16, 2007.

* cited by examiner

*Primary Examiner*—Greg Binda
(74) *Attorney, Agent, or Firm*—Ingrassia Fisher & Lorenz, P.C.

(57) ABSTRACT

A torque limiter for use on an aircraft comprises a drive shaft having a toothed outer portion, an output shaft, and a spline having an aperture therethrough for receiving the toothed portion. The spline is configured to rotationally couple the drive shaft to the output shaft and to rotationally disengage from the output shaft when the torque at the drive shaft exceeds a predetermined torque threshold. The spline comprises an outer annular portion and an inner annular portion configured to receive a lubricant. The inner annular portion comprises a plurality of circumferentially-spaced tooth structures and root structures. At least one of the root structures has at least one slot therein for receiving and retaining the lubricant.

10 Claims, 4 Drawing Sheets

US 7,491,127 B2

SPLINE WITH LUBRICANT RETENTION FEATURE FOR USE IN TORQUE LIMITER

TECHNICAL FIELD

The present invention relates to a torque limiter employed in an aircraft's transcowl actuation system and, more particularly, to a spline including an inner annular portion having one or more lubricant retaining features.

BACKGROUND

In spline couplings and other such rotary couplings (e.g., epicycle gear couplings), a drive shaft may be received within a cavity provided through annular plate or spine. In certain systems, the spline may translate with respect to the drive shaft. For example, in a ball ramp torque limiter, the spline may comprise a translating plate having a plurality of inner teeth that engage outer teeth provided about the drive shaft. The spline is spring biased toward a second, non-translating plate that is coupled to an output shaft. When the torque at the drive shaft is below a predetermined threshold, the spline and the non-translating plate abutting engage. The spline and the non-translating plate each include a series of conical pockets therein. Each conical pocket provided on the spline cooperates with a pocket on the non-translating plate to form a ramped cavity. An axial load ball bearing resides in each ramped cavity, and generally serves to transfer torque from the spline to the non-translating plate. As the torque limiter rotates, a shear force is exerted on the ball bearings. When the torque at the drive shaft exceeds the predetermined torque threshold (the activation torque), the shear force exerted on the ball bearings exceeds the spring force exerted on the spline. As a result, the ball bearings roll up the cavities' ramped sides and leave their respective cavities. This causes the spline and the non-translating plate to separate thereby permitting the drive shaft to rotate independently of the output shaft. The transfer of torque to the output shaft is thus limited when the torque at the drive shaft exceeds the predetermined threshold.

Rotary couplings typically require lubrication to ensure optimal functioning. In the case of a spline coupling utilized in a ball ramp torque limiter, a lack of lubrication may lead to excessive friction and a consequent increase in the activation torque (i.e., the predetermined torque threshold at which the transfer of torque is interrupted). This increase in the activation torque may, in turn, result in damage to system components. Even after initial application, re-application of lubricant is often required as the lubricant may be expelled at high rotational frequencies by centrifugal forces. If grease is used as the lubricant, the centrifugal force may separate the base oil from the thickener of the grease. Accessing the rotary coupling typically involves a cumbersome process thereby making repeated manual applications of lubrication impractical. Consequently, various sub-systems have been developed that actively supply lubricant to rotary couplings; however, such sub-systems may be relatively complex and expensive to employ. In addition, such sub-systems add to the weight of the rotary coupling, which may be problematic if the rotary coupling is utilized in a system deployed on an aircraft (e.g., a torque limiter employed in a ballscrew actuator). Furthermore, active supply sub-systems may have difficulty conducting thicker lubricants (e.g., grease).

Considering the above, it should be appreciated that it would be desirable to provide a rotary coupling employing a spline having one or more features that facilitate the retention of lubricant. It should also be appreciated that it would be advantageous if such lubricant retaining features also promoted the uniform dispersal of lubricant. Furthermore, other desirable features and characteristics of the present invention will become apparent from the subsequent detailed description of the invention and the appended claims, taken in conjunction with the accompanying drawings and this background of the invention.

BRIEF SUMMARY

A torque limiter for use on an aircraft is provided. The torque limiter comprises a drive shaft, an output shaft having a toothed portion, and a spline coupled to the drive shaft and having an aperture therethrough for receiving the toothed portion. The spline is configured to disengage from the toothed portion when the torque at the drive shaft exceeds a predetermined threshold to limit the transfer of torque from the drive shaft to the output shaft. The spline comprises an outer annular portion and an inner annular portion configured to receive a lubricant. The inner annular portion comprises a plurality of circumferentially-spaced tooth structures and root structures. At least one of the root structures has at least one slot therein for receiving and retaining the lubricant.

Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The preferred exemplary embodiment of the present invention will hereinafter be described in conjunction with the appended drawings, where like designations denote like elements, and.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
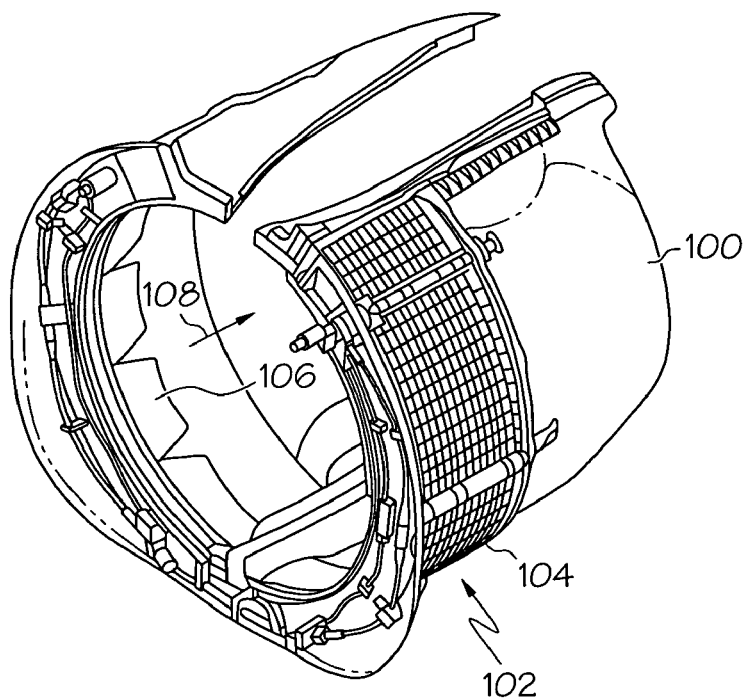
FIG. 1 is an isometric cutaway view of a conventional jet engine fan case.

FIG. 1 is an isometric cut-away view of a jet engine fan case 100 incorporating a cascade-type thrust reverser system 102 that may be deployed on an aircraft (not shown). Thrust reverser 102 comprises a plurality of cascade vanes 104 disposed on a circumferential portion of case 100. Cascade vanes 104 are illustrated as exposed in FIG. 1; however, vanes 104 are typically covered by a plurality (e.g., two) of translating sleeves or cowls referred to as transcowls and discussed below in conjunction with FIG. 2. The transcowls are mechanically linked to a series of blocker doors 106, which are moveable between a stowed and a deployed position. In the stowed position (illustrated in FIG. 1), blocker doors 106 are oriented parallel to a bypass air flow path 108. When thrust reverser system 102 is activated, blocker doors 106 rotate into a deployed position thereby blocking bypass air flow path 108 and the transcowls translate aft. This causes cascade vanes 104 to be exposed and the bypass air flow to be redirected out of cascade vanes 104 in a generally forward direction thereby creating a reverse thrust, which helps to decelerate the aircraft upon landing.

Figure 2:
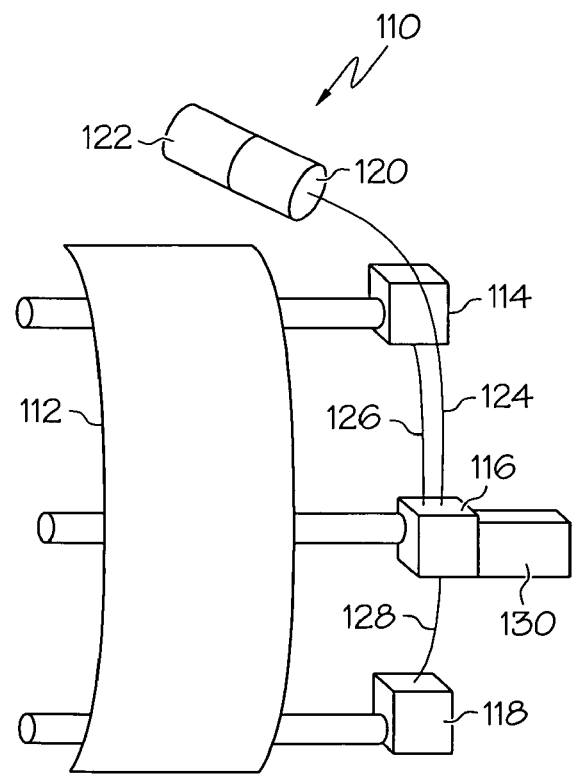
FIG. 2 is a functional view of a transcowl actuation system suitable for use in conjunction with the fan case shown in FIG. 1.

FIG. 2 is a functional view of a portion of a transcowl actuation system 110 suitable for use in conjunction with thrust reverser system 102 (FIG. 1). Transcowl actuation system 110 comprises a transcowl 112 fixedly coupled to a plurality (e.g., three) of ball ballscrew actuators (i.e., an upper actuator 114, a center actuator 116, and a lower actuator 118). A motor 120, including a brake 122 (e.g., torque activated brake assembly), is directly coupled to center actuator 116 by way of a drive mechanism 124 (e.g., a flexible drive shaft). Center actuator 116 is coupled, in turn, to upper actuator 114 and lower actuator 118 by way of flexible shafts 126 and 128, respectively. Drive shafts 124, 126, and 128 ensure that actuators 114, 116, and 118, and thus all points on transcowl 112, move in a substantially synchronized manner. Motor 120 commands actuator 116, and thus actuators 114 and 118, to extend or retract their respective shafts to move transcowl 112 between a deployed position (vanes 104 exposed as shown in FIG. 1) and a stowed position (vanes 104 covered). If desired, center ball ballscrew actuator 116 may include a manual drive unit (MDU) 130, which allows the manual actuation of transcowl 112 during routine maintenance.

Figure 3:
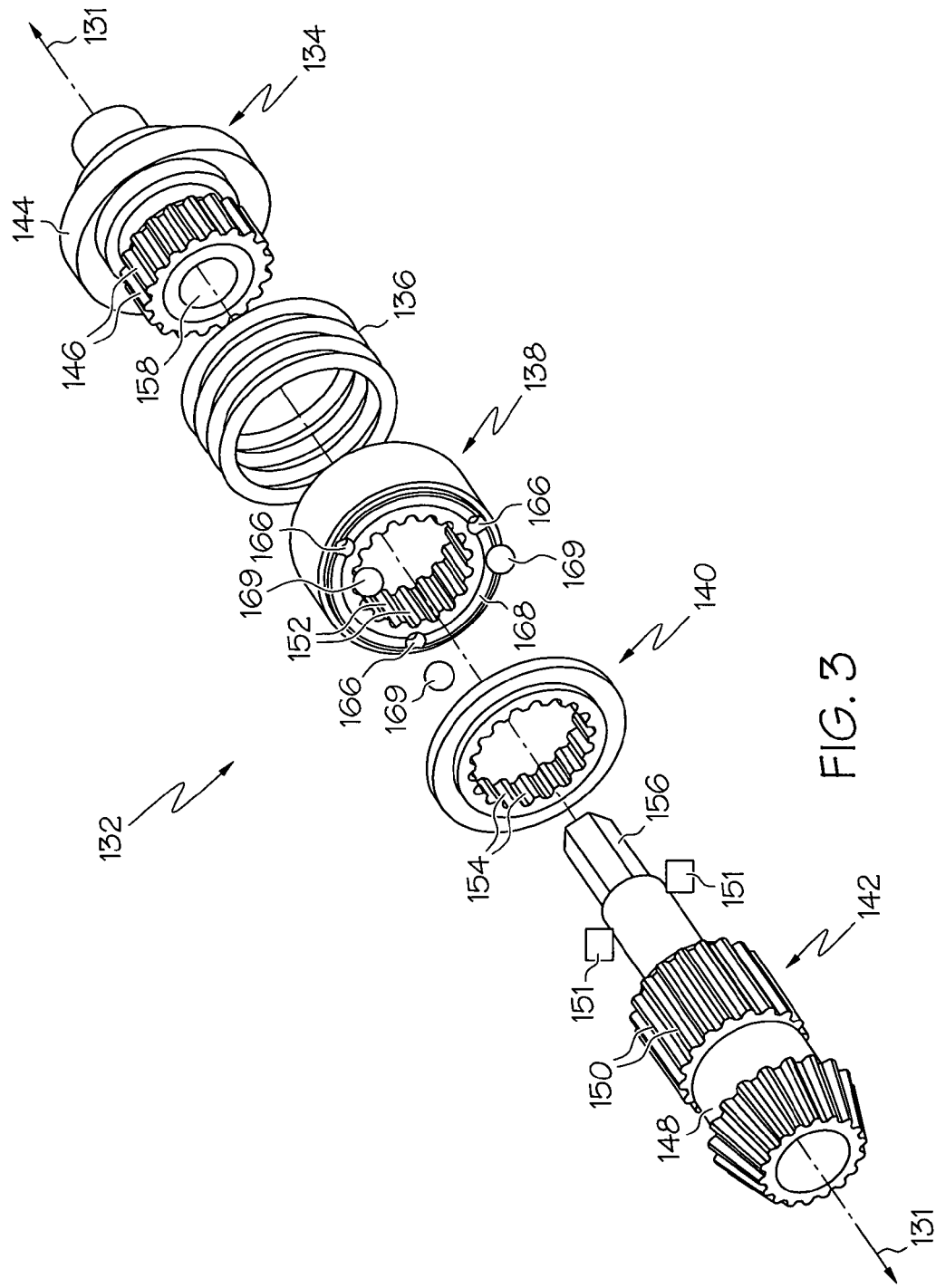
FIG. 3 is an exploded view of a ball ramp torque limiter that may be employed in the transcowl actuation system shown in FIG. 2.

To prevent physical damage to transcowl 112, a torque limiter (e.g., a ball ramp torque limiter) may be incorporated into MDU 130 (or into any one of actuators 114, 116, and 118). FIG. 3 provides an exploded view of ball ramp torque limiter 132 suitable for this use. Torque limiter 132 is configured for rotational movement about rotational axis 131 and comprises an input/drive shaft 134, a spring 136, a translating plate or spline 138, a set of torque-transferring ball bearings 169, a non-translating plate 140, and an output shaft 142. A set of bearings 151 is disposed about a segment of output shaft 142 and axially engages non-translating plate 140. Drive shaft 134 includes an annular collar 144 and a splined or toothed end portion having a plurality of outer teeth 146 circumferentially disposed there round. Similarly, output shaft 142 includes an annular collar 148 and a splined or toothed medial portion having a plurality of outer teeth 150 circumferentially disposed there round.

Output shaft 142 includes a longitudinal post 156 that may be received by a cylindrical cavity 158 provided in the first end portion of drive shaft 134. Spring 136, spline 138, and non-translating plate 140 each have an aperture therethrough for receiving post 151, and spline 138 and plate 140 each have a plurality of inwardly-protruding teeth 152 and 154, respectively. When threaded over post 156, non-translating plate 140 is placed in an abutting relationship with bearings 151, and inner teeth 154 engage outer teeth 150. Spline 138 and spring 136 are also threaded over post 156 such that a first end of spring 136 abuts collar 144 and a second, opposite end of spring 136 abuts spline 138. Thus, when torque limiter 132 is assembled, spring 136, translating spline 138, and non-translating plate 140 are confined between collar 144 of drive shaft 134 and collar 148 of output shaft 142, and spline 138 is biased toward plate 140 by spring 136.

As can be seen in FIG. 3, a plurality (e.g., three) of conical pockets 166 is provided in the first end section of spline 138 adjacent non-translating plate 140. Three identical conical pockets are also provided in non-translating plate 140 (not shown). A circular track 168 transects each of pockets 166. When translating spline 138 abuttingly engages non-translating plate 140, pockets 166 cooperate with the pockets in non-translating plate 140 to form a series of ramped cavities. A torque-transferring ball bearing 169 is disposed within each of these cavities. Ball bearings 169 generally serve to transfer torque from spline 138 to non-translating plate 140. As torque limiter 132 rotates, a shear force is exerted on ball bearings 169. Ball bearings 169 remain in their respective cavities when the shear force exerted on bearings 169 is less than the force exerted on translating spline 138 by spring 136. When the torque at drive shaft 134 meets or exceeds the threshold value, however, the shear force exerted on ball bearings 169 overcomes the spring force exerted on spline 138. As a result, ball bearings 169 roll up the ramped sides of the cavities and enter track 168. Ball bearings 169 consequently force translating spline 138 to separate from non-translating plate 140, move toward collar 144 of drive shaft 134, and compress spring 136. Drive shaft 134 is thus permitted to rotate independently of output shaft 142, and bearings 169 do not transfer torque from drive shaft 134 to output shaft 142. In this way, torque limiter 132 limits the torque transferred to output shaft 142 when the torque at shaft 134 exceeds the predetermined threshold value.

As previously mentioned, the spline coupling employed by torque limiter 132 (and other such rotary couplings) generally requires lubrication to ensure optimal functioning. If the spline coupling of torque limiter 132 is not properly lubricated, an increase in the coefficient of friction may alter the torque at which spline 138 and plate 140 separate, which may ultimately result in damage to transcowl actuation system 110 (FIG. 2). Specifically, proper lubrication must be maintained along the inner annular portion of translating spline 138, which engages teeth 146 of shaft 134. However, as translating spline 138 may rotate at a relatively high rotational frequency (e.g., 10,000 revolutions per minute), lubricant applied to the inner portion of spline 138 may be expelled by centrifugal force. Additionally, if grease is used as the lubricant, the centrifugal force may separate the base oil from the thickener of the grease. In accordance with the present invention, spline 138 may be replaced with a rotatable body or spline having one or more lubricant retaining features to minimize the loss of lubrication and to facilitate the dispersal of lubrication during rotation as described in more detail below.

Figure 4:
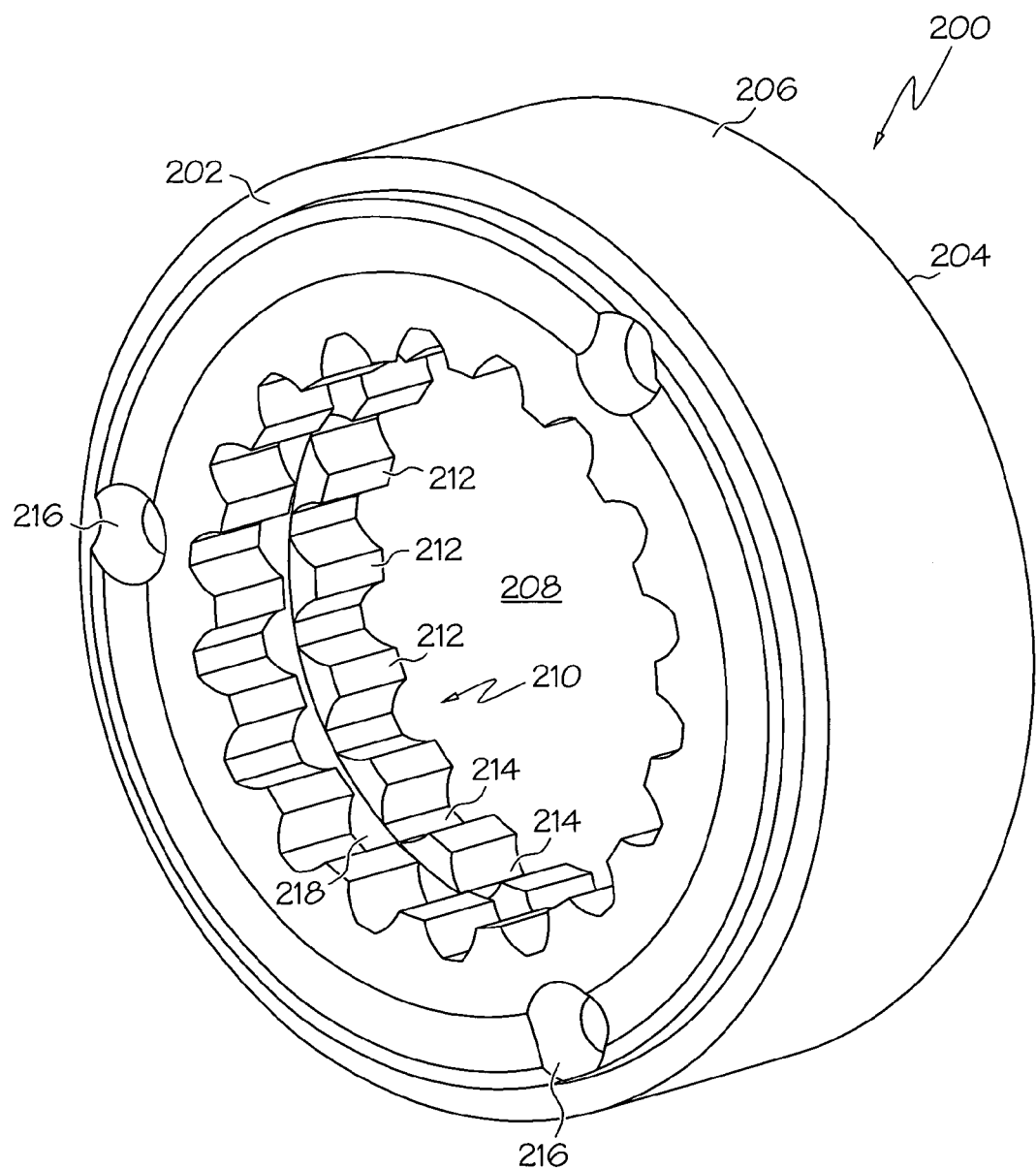
FIGS. 4, 5, and 6 are isometric views of a spline suitable for use in conjunction with torque limiter shown in FIG. 3 in accordance with first, second, and third embodiments of the present invention, respectively.

FIG. 4 illustrates a translating plate or spline 200 having a lubricant retaining feature in accordance with a first embodiment of the present invention. Spline 200 (e.g., carbonized steel) comprises a first end section 202, a second end section 204 substantially opposite section 202, and a medial section 206 intermediate sections 202 and 204. Sections 202, 204, and 206 cooperate to form a substantially tubular (e.g., annular) body comprising an outer annular portion and an inner annular portion 210 having an aperture 208 therethrough. Inner annular portion 210 includes a plurality of inwardly-protruding teeth 212 circumferentially spaced around portion 210. Teeth 212 are configured to matingly engage the teeth of a rotatable body disposed within aperture 208 (e.g., teeth 146 of input shaft 134) as described above. Inner annular portion 210 further includes a plurality of root structures 214 that are interspersed with teeth 212. Root structures 214 may be conveniently described as exposed portions of an inner annular surface from which teeth 212 protrude and in which the lubricant retaining feature or features (described below) are disposed. If employed in a ball ramp torque limiter, such as torque limiter 132 (FIG. 3), spline 200 may include a plurality of hemi-spherical pockets 216 in end section 202 for receiving axial load ball bearings in the manner described above.

Spline 200 is provided with a slot or groove 218 around an inner circumference of medial section 206. In particular, groove 218 is provided within inner annular surface 210, and transects (e.g., bisects) each of teeth 212. Groove 218 provides spline 200 with a reservoir capable of retaining a significant volume of lubricant (e.g., grease) during rotational movement. During rapid rotation of body 200, centrifugal force will direct lubricant into groove 218 wherein the lubricant will be retained by the inner walls of groove 218. Additionally, groove 218 may facilitate the dispersal of lubricant about inner annular surface 210 by, for example, facilitating the flow of lubricant between adjacent pairs of root structures 214. Considering this, it should be appreciated that spline 200 will retain lubrication longer than will a conventional spline.

Figure 5:
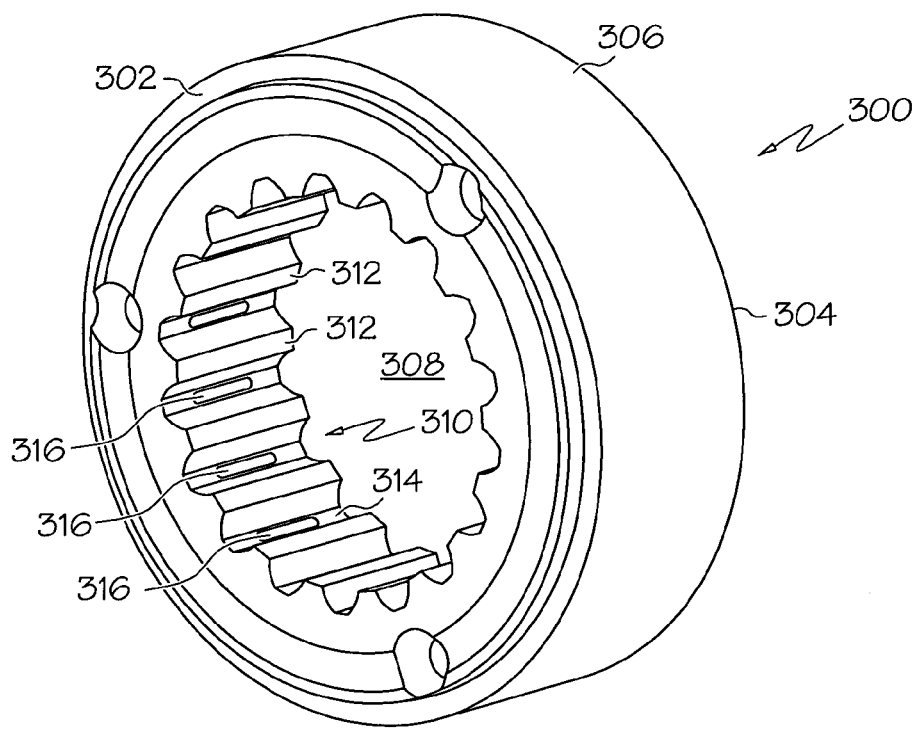

FIG. 5 illustrates a spline 300 in accordance with a second embodiment of the present invention. Spline 300 is similar to spline 200 (FIG. 4); i.e., spline 300 includes a first end section 302, a second end section 304, and a medial section 306 disposed between sections 302 and 304. Sections 302, 304, and 306 cooperate to form an annular body having an aperture 308 therethrough and an inner annular portion 310, which comprises a plurality of alternating teeth 312 and root structures 314. Unlike spline 200, however, spline 300 includes a plurality of radially transverse slots 316 between each of teeth 312. Preferably, each slot 316 is disposed within the middle of a different one of root structures 314, and is substantially parallel to the axis about which spline 300 rotates. Slots 316 may assume a variety of shapes and dimensions. Slots 316 should not, however, extend entirely through end section 302 or end section 304 as this would allow lubricant to escape from inner annular portion 310 during the rotation of spline 300.

Figure 6:
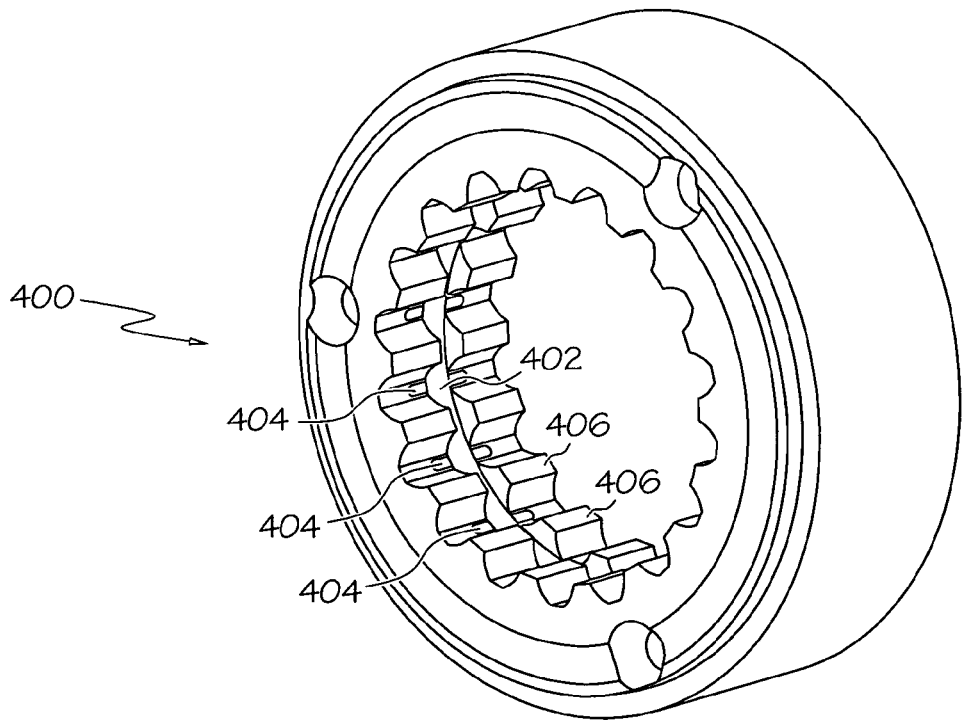

It should be apparent that radially transverse slots 316 of spline 300 (FIG. 5) will function to provide lubricant retention in substantially the same way as does circumferential groove 218 of spline 200 (FIG. 4). This not withstanding, slots 316 will not readily facilitate the dispersal of lubricant along the inner annular portion 310 of spline 300. To facilitate the dispersal of lubrication, the inventive spline may be provided a combination of lubricant retaining features. As an example, spline 400, which is shown in FIG. 6, is provided with a circumferential groove 402, a plurality of radially transverse slots 404, and a plurality of inner teeth 406. Groove 402 extends through (e.g., bisects) each of teeth 406 and transects (e.g., bisects) each of radially transverse slots 404. Groove 402 permits fluid communication between adjacent ones of slots 404 thereby promoting the uniform dispersal of lubrication along the inner annular surface of spline 400. As an additional advantage, the collective volume of groove 402 and slots 404 is significantly greater than that of groove 402 or radially transverse slots 404 alone thereby improving the lubricant retaining ability of spline 400.

The lubricant retaining features described above may be machined into the spline after manufacture. The structure and dimensions of the lubricant retaining features will vary with the dimensions of the spline and the intended application. For example, if the spline is to be utilized for an application requiring maximum tooth strength, a circumferential groove may be preferable over a plurality of radially transverse slots disposed in the root structures. In general, however, it will be preferable to utilize a combination of lubricant retaining features (e.g., a circumferential groove with a plurality of radially transverse slots) to maximize the lubricant retaining ability of the spline. Though discussed above in conjunction with a spline coupling utilized by a ball ramp torque limiter, it should be understood that the inventive lubricant retaining features are equally applicable to other rotary couplings (e.g., epicycle gear couplings) and spline couplings utilized in other contexts.

In view of the above, it should be appreciated that a rotary coupling employing a rotatable body (e.g., a spline) having one or more features that facilitate the retention and dispersal of lubricant has been provided. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

The invention claimed is:

1. A spline having a cavity therein for receiving a rotatable shaft having a plurality of outer teeth and for receiving a lubricant, the spline comprising:
   an inner annular surface proximate the cavity;
   a plurality of inner teeth extending from said inner annular surface into the cavity and configured to engage the plurality of outer teeth;
   a plurality of radially transverse slots in said inner annular surface for receiving and retaining the lubricant; and
   a circumferential groove formed in said inner annular surface and extending through said plurality of inner teeth, said circumferential groove fluidly coupling each slot in said plurality of radially transverse slots;
   wherein said circumferential groove and said plurality of radially transverse slots are configured to retain the lubricant during operation without receiving additional lubricant from an active lubricant supply source.

2. A spline according to claim 1 wherein each of said plurality of radially transverse slots is substantially disposed between a different pair of adjacent ones of said plurality of inner teeth.

3. A spline according to claim 2 wherein each of said plurality of radially transverse slots is substantially parallel along its longitudinal axis to each of said adjacent ones of said plurality of inner teeth.

4. A spline according to claim 2 wherein each of said plurality of inner teeth has a length greater than that of each of said plurality of radially transverse slots.

5. A spline according to claim 1 wherein said groove substantially bisects each of said plurality of inner teeth.

6. A splined shaft assembly configured to receive lubrication, comprising:
   a splined shaft rotatable about a rotational axis; and
   a spline having an aperture therethrough that accommodates said splined shaft and capable of translational movement with respect thereto, said spline having an inner annular surface including a plurality of inner teeth spaced around the rotational axis and configured to engage said splined shaft, and having a plurality of radially transverse slots and at least one groove in said inner annular surface for the retention of lubrication during rotation, said plurality of radially transverse slots and said at least one groove each fluidly exposed only through said inner annular surface of said spline and fluidly enclosed by said plurality of inner teeth when said spline engages said splined shaft;

wherein said plurality of radially transverse slots and said at least one groove are configured to passively retain the lubricant when said spline engages said splined shaft without receiving additional lubricant from an active lubricant supply source.

7. A splined shaft assembly according to claim 6 wherein said at least one groove extends along a medial circumference of said inner annular surface.

8. A splined shaft assembly according to claim 6 wherein said each of said radially transverse slots resides between a different pair of adjacent ones of said plurality of inner teeth, and wherein said groove extends through each of said plurality of inner teeth.

9. A splined shaft assembly according to claim 8 wherein said groove substantially bisects each of said plurality of radially transverse slots.

10. A splined shaft assembly according to claim 6 wherein each of said plurality of radially transverse slots is substantially parallel to the rotational axis.

* * * * *